April 14, 1931. P. SCHWARZKOPF 1,800,758
PROCESS FOR THE PRODUCTION OF CHEMICALLY PURE TUNGSTEN TRIOXIDE
Filed Dec. 27, 1927
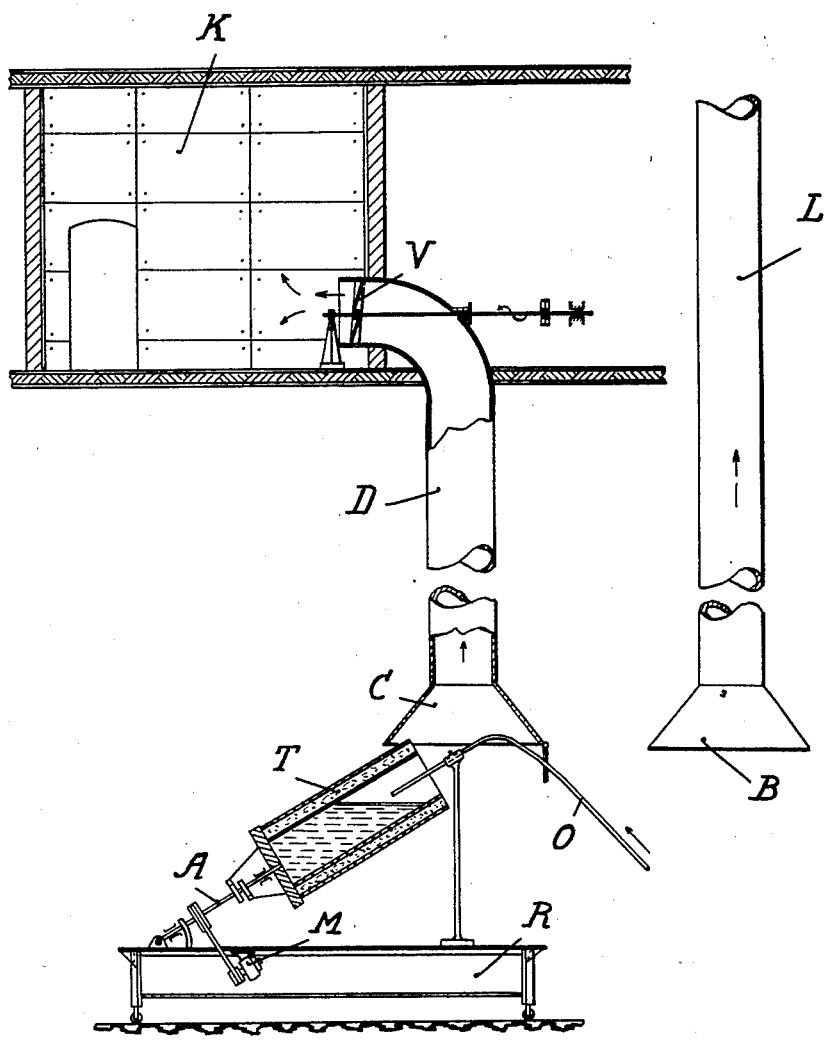
P. Schwarzkopf
INVENTOR
By Marks & Clerk
Attys.

Patented Apr. 14, 1931

1,800,758

UNITED STATES PATENT OFFICE

PAUL SCHWARZKOPF, OF BERLIN-HALENSEE, GERMANY

PROCESS FOR THE PRODUCTION OF CHEMICALLY-PURE TUNGSTEN TRIOXIDE

Application filed December 27, 1927, Serial No. 242,863, and in Germany December 31, 1926.

Tungsten trioxide $WO_3$ (tungstic acid anhydride) and tungstic acid itself, which form the initial material for the production of practically all other tungsten products, have hitherto been extracted by chemical means from the available ores and other products containing tungsten. The electrolytic process suggested by Pearson and not employed industrially, is not an exception, because with this process only sodium tungstate is obtained electrolytically, which substance however is worked up into tungstic acid by chemical means.

The ores, purified and concentrated to as complete an extent as possible by mechanical means were first of all decomposed by fusing with alkalies, alkali sulphides or bisulphates, or by boiling with acids, or finally by electrolysis in the presence of solutions of sodium hydroxide, whereupon alkali or ammonium tungstate solutions were obtained in the first case by direct treatment with water, in the second by treating with lyes or ammonium hydroxide and in the third case directly. From these solutions, tungstic acid was obtained directly by the addition of mineral acids, which acid can be converted by drying and calcining into tungsten trioxide directly or after being dissolved again and re-precipitated. It is also possible first of all to crystallize the tungstate out of the tungstate solutions and to convert it into $WO_3$ directly or after one or several re-crystallizations by the action of acids (in the case of ammonium tungstate also by calcination).

According to another process calcium tungstate is precipitated from the tungstate solution by the addition of calcium salts, and the calcium tungstate is decomposed, after being thoroughly washed, by boiling with an excess of nitric or hydrochloric acid, while a third process, starting from wolframite, avoids the detour involving the alkali tungstate and by fusing the wolframite with calcium chloride passes from the ore directly to calcium tungstate, which is decomposed by acids.

If the initial material in the production of tungsten trioxide was not ore, but waste material from the manufacture of tungsten wire and sheet metal (which is frequently the case in the production of extremely pure tungsten trioxide), then hitherto the conversion of the tungsten contained in these products into tungsten trioxide was also effected through the intermediary of alkali tungstate solutions, which were obtained by decomposing with alkali nitrites or heating in a current of dry chlorine, decomposing the resulting tungsten hexachloride by dilute nitric acid and dissolving the resulting tungsten oxides and oxychlorides in lyes (this process in a somewhat modified form has moreover also been proposed for the direct preparation of the ores) and which were then worked up in the same way as previously described.

In carrying out the foregoing chemical processes industrially it is practically impossible to obtain a tungsten trioxide which is chemically pure in the truest sense of the word. The difficulty in preparing it in a pure state lies in the first place in the close chemical relationship of tungsten and molybdenum. The only practical possibility of obtaining tungsten products free from molybdenum is as a matter of fact by the use of scheelite which in most of its occurrences is free from molybdenum or at least poor in molybdenum, or of tungsten wire and sheet metal waste as initial material. The second difficulty is due to the fact that tungsten forms complex compounds not only with phosphoric acid and silicic acid, but also with iron and manganese, which no longer show the normal reactions and consequently also cannot be removed by the ordinary methods. The third difficulty lies in the tenacity, which has not been entirely explained, with which tungsten trioxide prepared from tungstates, retain traces of alkali and ammonia in spite of most thorough washing.

Molybdenum, owing to its capacity for being more easily pulverized, is one of the most undesirable impurities for tungsten in its practical use in the incandescent lamp, Röntgen tube and electron tube industry, even 0.02% of molybdenum in tungsten has a detrimental effect. The other impurities referred to, which are difficult to eliminate, more especially silica, and the traces of alkali and ammonia, affect both the behaviour of tungsten metal when it is being worked up into rods, wires and sheets and also in the practical use of the finished products; even percentages of a few thousandths often have a detrimental effect.

The effect of silica and of the alkali lies in their action both on the growth of the grains and consequently on the structural development in the initial bars for the manufacture of wire and sheet metal, as well as upon the changes in the granular structure during the working up of these bars and the practical use of the finished products at an increased temperature.

One cannot however always refer to this effect as being detrimental in the proper sense of the word, because silica and alkalies are often purposely used as admixtures to tungsten metal in definite cases owing to their effect upon the growth of the grains. The injuriousness however lies in the fact that the proportions of such foreign substances which remain as impurities in tungsten trioxide, cannot be arbitrarily influenced. Owing to the great sensitivity of tungsten metal with respect to such foreign substances, even the smallest variations in the percentage of the impurities, which it is impossible to avoid even when the greatest care is taken to keep the working conditions uniform, cause fluctuations in quality by changing the structure of the metals prepared from the acid.

Attempts have been made for years, more especially in the incandescent lamp industry, to impart to the wires a definite crystalline structure (structure of the single crystals, structure of the superposed crystals) in order to obtain stability of form, more especially for the coils made from the wire, during incandescence as well as also when cold after they have been incandescent for some time, and in order to maintain as far as possible the ductility of the wires obtained by drawing. According to what has been said in the foregoing, this can only be obtained inspite of the most comprehensive refining of tungsten metal by thermal or mechanical means, if one is able to influence its composition up to percentages of thousandths.

Naturally this is only possible if use is made of an initial tungsten material possessing the maximum degree of purity conceivable. This applies not only to the manufacture of wires, but also to the manufacture of sheet metal and other tungsten products, so far as a definite structural development must be aimed at in their case also.

Seeing that for all the known processes for the production of tungsten metal, $WO_3$ forms the initial material, it has long been the aim of the inventor to produce a tungsten trioxide, which possesses the required maximum purity referred to.

According to an earlier proposal of the present inventor, tungsten ores are fused after a suitable preparatory treatment, whereupon the tungsten trioxide is extracted from the melt by evaporation and subsequent condensation.

As pointed out previously, most ores containing tungsten always contain molybdenum impurities. As the boiling point of $MO_3$ however is far below the boiling point of $WO_3$—800° as compared with over 1200° C.—it is possible with this process to completely separate tungsten from molybdenum, and also from the other more readily volatile impurities in the ore. They are volatilized before the actual evaporating of tungsten trioxide commences.

The impurities which are not so readily volatilized or practically not volatile at all remain in this process in the melt, so that it is possible to obtain in a surprisingly simple manner tungsten trioxide which shows no trace of molybdenum, alkali, silica and other admixtures, i. e. a tungsten trioxide which is chemically pure in a very different degree, indeed in the highest degree as compared with any other tungsten trioxide produced by chemical means in the manner described in the foregoing. In comparison with all chemically produced tungsten trioxide it has the further extraordinary advantage that is is of maximum fineness and uniformity in the size of its individual grains; these two factors in conjunction however are of great advantage in the production of bars according to the sintering process generally usual in the tungsten industry.

This method of evaporation from the melt and condensation of the oxide vapors has been adopted in the industry and proved exceedingly satisfactory both for the production of molybdenum trioxide and tungsten trioxide. Whereas it is not only the best but also the cheapest process for the production of molybdenum trioxide, the inventor has recognized that for the production of tungsten trioxide it is still somewhat expensive, as it is necessary to use temperatures of 1500° C. and more, which greatly tax the material of the crucibles in which the ores are melted and necessitate a frequent renewal of the crucibles which are comparatively expensive owing to their high resistance to heat. The fact that the evaporation of the tungsten trioxide from the melt can only be carried out comparatively slowly also makes the process expensive. This evaporation can only take place to the same extent as the molten calcium or iron or manganese tungstate (according to whether use is made of scheelite, wolframite or hübnerite as primary ore) disintegrates into its constituents. At the temperature at which the ores melt (about 1500° C.) and which must not be exceeded to any great extent in view of the crucible material, the equilibrium

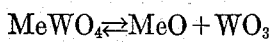

is very much displaced to the left. Consequently in the state of equilibrium, $WO_3$ is only present in small percentages and upon the equilibrium being disturbed by the conveying away of $WO_3$ it is only gradually supplied in small percentages by the further disassociation of the ore.

Although this process for the production of tungsten trioxide is cheaper than those hitherto known and is far superior thereto owing to the previously unattained purity and fineness of the acid, the inventor has nevertheless considered the problem of making his process less expensive while maintaining the advantages obtained. Since according to his knowledge it was solely the necessary high temperatures which made the process expensive in the manner described, he proceeded to investigate the possibility of and conditions for reducing these temperatures and consequently to cheapen the "way through the gaseous phase" which he knew to be a decisive factor for the purity and fineness of the acid and must therefore be fundamentally maintained.

The first difficulty was that in reducing these temperatures one must go below the melting point of tungsten ore and tungsten trioxide and there was no clear knowledge of the behaviour of tungsten in such a case. Whereas it was known for instance for molybdenum trioxide that it sublimes at atmospheric pressure, without melting, and Wöhler made use of this fact as early as 1856 for the production of molybdenum trioxide from the ore and Debray in 1868 for purifying molybdenum trioxide for the purpose of determining the atomic weight of molybdenum, there was very little known in the literature regarding the sublimation of $WO_3$ when the inventor began his investigations.

Bernouli observed as early as 1860 the formation of large crystals by sublimation in the case of strong calcination of $WO_3$ and mentions this observation in his work in Poggendorfs Annalen, volume III, page 576. According to Read (I. Chem. Soc., volume 65, page 313, 1894) however tungsten trioxide is alleged to be still unchanged at 1750° C. Further statements than those mentioned, from which any conclusions might have been drawn with regard to the possibility of obtaining $WO_3$ by sublimation, were not to be found either in scientific or in patent literature.

For the purpose of solving his self-appointed problem the inventor has himself investigated the behaviour of tungsten trioxide when heated below its melting point, but suitably above that of molybdenum trioxide. He found that as low as 1100° C. tungsten trioxide begins to sublime or distil at atmospheric pressure, whereas it does not melt until 1400° C. Consequently his invention consists in obtaining tungsten trioxide by distillation below its melting point or that of the ore (about 1500° C.) i. e. at temperatures which can be conveniently obtained in practice and can be used without difficulty.

The process will be more fully illustrated by means of a practical example. The drawing shows more diagrammatically and in partial vertical section an apparatus suitable therefor.

Tungsten ores are first of all subjected to the reducing action of carbon or hydrogen and then heated in a cylindrical crucible represented on the drawing by T, while a current of air, the speed of which can be regulated, passes from the supply pipe O over the surface of the ore in the crucible.

During the heating, which is effected by means of a metal foil, not shown on the drawing, wound round the crucible or suitably mounted in the wall thereof and traversed by electric current, the crucible is kept in continuous slow rotation. It is mounted upon an inclined axis A which makes an angle of about 45° with the horizontal and is rotated at an adjustable speed by an electric motor or the like M. The result of the inclined position of the crucible is that as large a surface as possible of the glowing ore is exposed to the action of the stream of air and the rotation causes fresh parts of the ore continually to come into contact with the air. The crucible with its drive is mounted on a movable frame R, which enables the crucible to be placed with its opening in some cases under the funnel B and in other cases under the hood C.

After the hot crucible has been charged with the reduced ore it is first of all placed under the hood B and kept in rotation here at a temperature of about 1050° C., air being at the same time passed over its contents. At this temperature all constituents which volatilize up to 1050° C. distil out of the ore and escape through the hood B and the outlet pipe L, for instance into the open air; that is to say those which are in themselves volatile as well as those from which volatile compounds are formed by combination with oxygen, such as for instance molybedenum. Tungsten does not yet distil out at this temperature however, in any case only in negligible quantities. As soon as the formation of vapors has ceased, the movable furnace is moved under the hood C and the temperature increased to about 1200–1300° C. At these temperatures the oxidation of the tungsten metal formed in the ore by reduction takes place to a considerable extent, with formation of tungsten trioxide in vapor form, which is carried by the stream of air (which can be assisted by a suction valve V at the upper end of the outlet pipe D) at a considerable speed through the funnel C and the outlet pipe D into the chamber K, in which it condenses from the vapor state owing to the decrease in the velocity of motion. The conveying away of the $WO_3$ the moment it is formed, accelerates the reaction, which leads to its formation to a very appreciable extent. In the chamber K the cooled acid falls to the bottom without coming into contact with any hot foreign substances.

The impurities in the ore are only volatile at temperatures below those at which the formation and evaporation of the tungsten trioxide takes place and the crucible is therefore under the funnel B, where as on the other hand at the temperatures at which tungsten trioxide distils out to a practically utilizable extent, none of the possible impurities in tungsten ores are volatile. Consequently the product carried by the current of air to the chamber K is chemically pure $WO_3$, which when the process is carried out as described, also cannot contain any foreign substances as impurities. It is practically as pure as a tungsten trioxide which is obtained by evaporation from the melt, and is in any case far purer than was obtainable by the methods hitherto adopted in the industry and described in the foregoing. Its cost is however considerably less in view of the low working temperatures used in the new process and the greater output capacity of the plant.

The tungsten trioxide which has settled in the chamber K in addition to being extremely pure, has a grain and subdivision which make it preeminently suitable for the production of metallic powders for the manufacture of wires of the smallest possible diameter and more especially of ductile sheet metal. Although it is quite loose, it is generally sufficiently dense. In special cases it can be passed between agate or steel rollers, exerting a mutual pressure of about 70 kg., to consolidate the trioxide to a further extent.

When reduced to pure metal, owing to its fine grain it offers considerably larger attacking surfaces to hydrogen than the acid hitherto obtainable, as a result of which the hydrogen can be more fully utilized and smaller velocities of flow may be used.

For sintering the fine-grained metallic powder obtained most inexpensively in this manner, a smaller amount of electric energy is required and in addition when sintering it is possible to employ temperatures very near to the melting point of tungsten. Consequently the sintering process is finished more quickly and the output and utilization of the plant is increased.

It is also possible to carry out the process according to the invention continuously and not intermittently, if in place of one crucible use is made of two or more crucibles in such a way that one is under the hood B, while another stands under the hood C. For this purpose the crucibles may be arranged for instance on a rotary table. Moreover in order to avoid moving the crucibles, a single outlet may be arranged over the fixed crucible, this outlet being forked at a suitable point. By changing over at the forked point, the generated vapors may be led either into the open air or into the condensation chamber. The complete separation of the outlets is decidedly to be preferred however for obtaining an absolutely pure acid.

Instead of the reduced ores, use may also be made for carrying out the process, of waste material from the manufacture of tungsten wire and sheet metal, as well as commercial tungsten as used for the manufacture of tungsten steels. Commercial tungsten trioxide and other products containing the same can also be converted in the same apparatus and by at least partial use of the described process, into chemically pure tungsten trioxide, which possesses a really ideal degree of purity. Naturally when materials containing tungsten trioxide are used as initial material, the current of air supplied serves to accelerate the formation of vapor and to convey away the acid distilled out, but not also to produce tungsten trioxide from the tungsten metal.

The inventor does not wish to state definitely whether in the described distillation of the tungsten trioxide, sublimation takes place in the actual physical sense or in what other way the $WO_3$ vapors are formed. On the contrary it may be reserved for purely scientific research to determine this point. The essential for his invention is that he generates $WO_3$ vapors at temperatures which are on the one hand above the temperatures of about 1000° C., which are the maximum in practice for the formation of $MO_3$ (molybdic acid) vapors from the melt, but on the other hand are below the melting point of $WO_3$, about 1400° C. (or of tungsten ores, about 1500° C.).

Another essential point is that he carries out a fractional distillation, the first part of which (heating in the first temperature interval) is carried out below the temperature at which $WO_3$ vapors are formed to an appreciable extent, i. e. under 1000–1100° C., while the fraction in which $WO_3$ vapors are expelled (heating in the second temperature interval) is obtained in the temperature interval from 1000°–1100° C. to about 1400°–1500° C. He prefers more especially for the first fraction (expelling of injurious volatile impurities, including possibly molybdenum trioxide) to employ a temperature of about 1050° C. and for the second fraction (expelling of the $WO_3$ vapors) a temperature of 1200 to 1300° Celsius.

What I claim is:—

1. Method of producing practically pure tungsten trioxide ($WO_3$) from tungsten containing material, which consists in first reducing said material by exposing it to the action of carbon; second, heating the reduced material to about 1050° C. while passing a current of air over its surface and giving the material a slow revolving motion thereby volatilizing the impure substances contained in said material and leading off said substances; third, raising the temperature to about 1300° C. while continuing the circular motion and the air flow over the surface of the remaining material thereby oxidizing the tungsten and volatilizing the formed tungsten trioxide; fourth, collecting and rapidly removing said trioxide and condensing the same.

2. Method of producing practically pure tungsten trioxide ($WO_3$) from tungsten containing material, which consists in first reducing said material by exposing it to the action of hydrogen; second, heating the reduced material to about 1050° C. while passing a current of air over its surface and giving the material a slow revolving motion thereby volatilizing the impure substances contained in said material and leading off said substances; third, raising the temperature to about 1300° C. while continuing the circular motion and the air flow over the surface of the remaining material thereby oxidizing the tungsten and volatilizing the formed tungsten trioxide; fourth, collecting and rapidly removing said trioxide and condensing the same.

In testimony whereof I have signed my name to this specification.

PAUL SCHWARZKOPF.